(12) United States Patent
Johnson et al.

(10) Patent No.: US 11,441,754 B1
(45) Date of Patent: Sep. 13, 2022

(54) VEHICLE LIGHTING ASSEMBLY WITH REFLECTOR SYSTEM AND LIGHT EMITTER

(71) Applicant: Ford Global Technologies, LLC, Dearborn, MI (US)

(72) Inventors: Aaron Bradley Johnson, Allen Park, MI (US); Luciano Lukacs, Plymouth, MI (US); Paul Kenneth Dellock, Northville, MI (US); Stuart C. Salter, White Lake, MI (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/406,505

(22) Filed: Aug. 19, 2021

(51) Int. Cl.

| | |
|---|---|
| *F21S 43/00* | (2018.01) |
| *F21S 43/31* | (2018.01) |
| *F21S 43/14* | (2018.01) |
| *F21S 43/241* | (2018.01) |
| *G02B 27/30* | (2006.01) |
| *F21Y 115/10* | (2016.01) |
| *F21W 107/10* | (2018.01) |
| *F21W 103/35* | (2018.01) |

(52) U.S. Cl.
CPC ............... *F21S 43/31* (2018.01); *F21S 43/14* (2018.01); *F21S 43/241* (2018.01); *G02B 27/30* (2013.01); *F21W 2103/35* (2018.01); *F21W 2107/10* (2018.01); *F21Y 2115/10* (2016.08)

(58) Field of Classification Search
CPC . G02B 27/30; F21S 43/31; F21S 43/14; F21S 43/241
See application file for complete search history.

(56) References Cited

U.S. PATENT DOCUMENTS

| | | | | |
|---|---|---|---|---|
| 4,389,698 | A * | 6/1983 | Cibie | F21S 41/24 362/520 |
| 6,712,492 | B2 * | 3/2004 | Shimura | G02B 6/0061 362/558 |
| 7,275,849 | B2 | 10/2007 | Chinniah et al. | |
| 2008/0232127 | A1 * | 9/2008 | Futami | G02B 6/0038 362/511 |
| 2011/0242831 | A1 * | 10/2011 | Okui | F21S 43/14 362/511 |

(Continued)

FOREIGN PATENT DOCUMENTS

| | | |
|---|---|---|
| CN | 209744280 U | 12/2019 |
| WO | 2021093234 A1 | 5/2021 |

*Primary Examiner* — Gerald J Sufleta, II
(74) *Attorney, Agent, or Firm* — Vichit Chea; Carlson, Gaskey & Olds, P.C.

(57) ABSTRACT

A light guide system for a vehicle includes, among other things, a housing that includes a first section and a second section that are secured together to provide a chamber A light emitter is disposed within the chamber. A light source is disposed outside the chamber A reflector system directs light emitted from the light source to the light emitter within the chamber. A vehicle lighting method includes, among other things, securing a first and second section of a housing assembly together to provide a chamber, and operatively coupling a reflector system within the chamber and a light source outside the chamber such that the reflector system can redirect light from the light source to a light emitter held within the chamber.

20 Claims, 4 Drawing Sheets

(56) References Cited

U.S. PATENT DOCUMENTS

| | | | |
|---|---|---|---|
| 2013/0314946 A1* | 11/2013 | Wilson | F21S 41/50 362/613 |
| 2014/0003075 A1* | 1/2014 | Yamada | F21S 43/20 362/511 |
| 2015/0219308 A1 | 8/2015 | Dross et al. | |
| 2020/0300440 A1* | 9/2020 | Monpremier | F21S 43/14 |

* cited by examiner

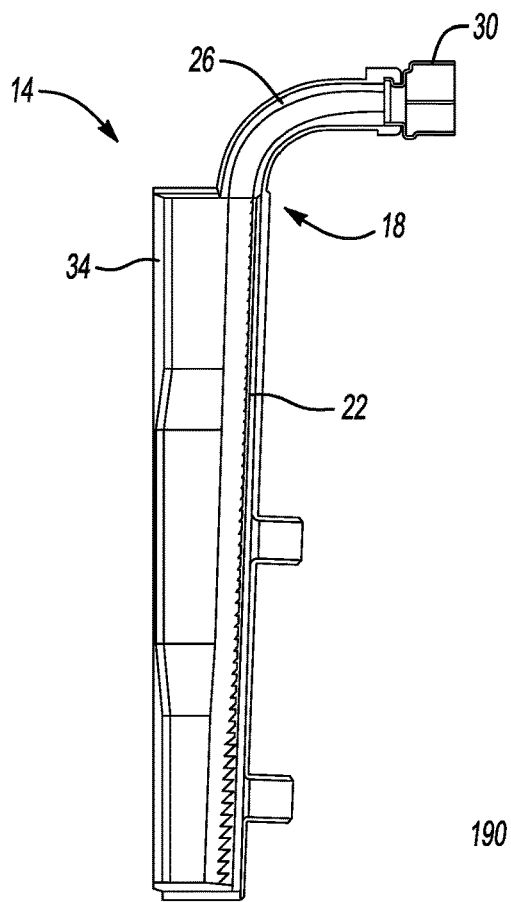
_Fig-6_
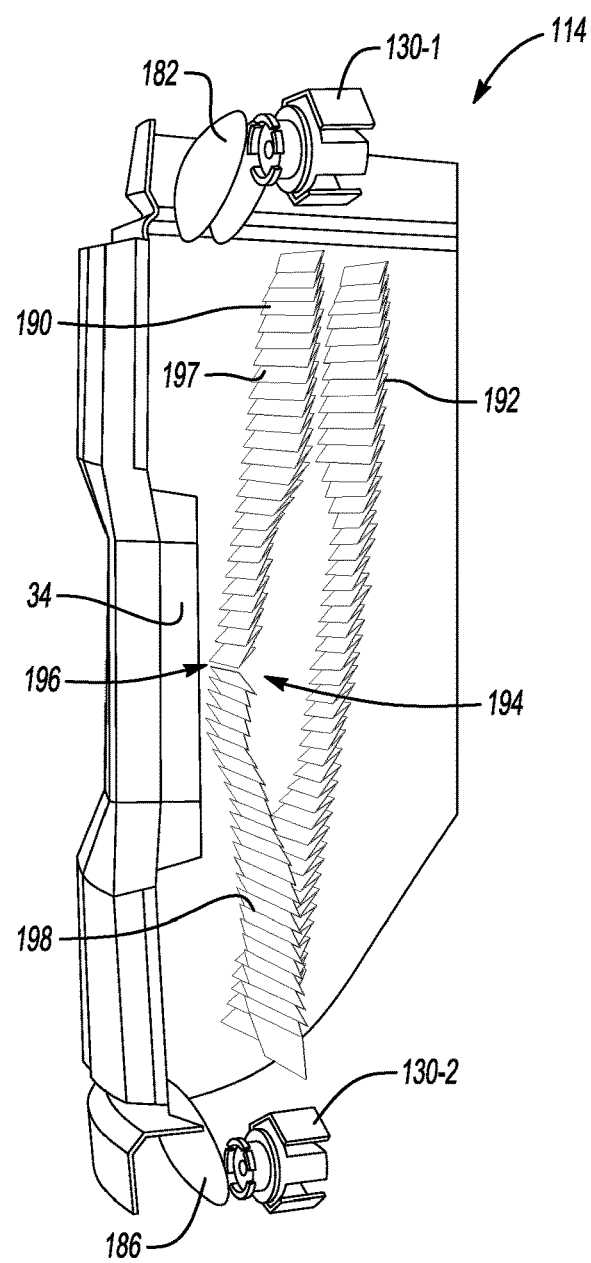
_Fig-7_

VEHICLE LIGHTING ASSEMBLY WITH REFLECTOR SYSTEM AND LIGHT EMITTER

TECHNICAL FIELD

This disclosure relates generally to a vehicle lighting assembly and, in particular, a lighting assembly having a chamber that receives light from a light source outside the chamber.

BACKGROUND

Vehicles can include lighting assemblies. Some vehicles lighting assemblies have light sources that are not readily serviceable.

SUMMARY

A vehicle lighting assembly according an exemplary aspect of the present disclosure includes, among other things, a housing including a first section and a second section that are secured together to provide a chamber A light emitter is disposed within the chamber. A light source is disposed outside the chamber. A reflector system directs light emitted from the light source to the light emitter within the chamber.

Another example of the foregoing assembly includes a light delivery device that includes a first portion that provides the light emitter and a second portion that provides the reflector system.

In another example of any of the foregoing assemblies, the reflector system includes at least two reflectors.

In another example of any of the foregoing assemblies, the light emitter extends along a longitudinal axis.

In another example of any of the foregoing assemblies, the light emitter includes a plurality of grooves disposed along the longitudinal axis. The grooves extend transversely to the longitudinal axis.

In another example of any of the foregoing assemblies, the light emitter includes a first axial end portion and a second axial end portion Each of the grooves has a depth. A depth of the grooves near the first axial end portion is different than the depth of the grooves near the second axial end portion.

In another example of any of the foregoing assemblies, the reflector system is a collimator.

In another example of any of the foregoing assemblies, the collimator is configured to convey light emitted from the light source to the chamber.

In another example of any of the foregoing assemblies, the collimator is a flexible collimator.

In another example of any of the foregoing assemblies, the chamber is lined with a first metallized layer of the first section and a second metallized layer of the second section.

Another example of any of the foregoing assemblies includes a lens that covers the chamber.

In another example of any of the foregoing assemblies, a surface of the lens that faces the chamber is textured.

In another example any of the foregoing assemblies, the light source is a Light Emitting Diode.

In another example any of the foregoing assemblies, the light source is a vehicle light.

In another example of any of the foregoing assemblies, the light emitter includes a longitudinal axis between a first axial end portion and a second axial end portion. The light emitter includes a plurality of grooves disposed along the longitudinal axis and extending transversely to the longitudinal axis Each groove of the plurality of grooves has a depth and the depth of the grooves near the first axial end portion is different than the depth of the grooves near the second axial end portion The reflector system is a flexible collimator that is configured to convey light emitted from the light source to the chamber The chamber is lined with a first metallized layer of the first section and a second metallized layer of the second section A lens covers the chamber. The lens includes a surface that faces the chamber. The surface is textured.

In another example of any of the foregoing assemblies, the light emitter is polycarbonate.

In another example of any of the foregoing assemblies, the first and second sections that provide the chamber are welded together.

A vehicle lighting method according to another exemplary aspect of the present disclosure includes, among other things, securing a first and second section of a housing assembly together to provide a chamber. The method further includes operatively coupling a reflector system within the chamber and a light source outside the chamber such that the reflector system can redirect light from the light source to a light emitter held within the chamber.

Another example of the foregoing vehicle lighting method includes redirecting light within the chamber through a lens using a metalized layer.

BRIEF DESCRIPTION OF THE FIGURES

The various features and advantages of the disclosed examples will become apparent to those skilled in the art from the detailed description. The figures that accompany the detailed description can be briefly described as follows:

FIG. 6 illustrates another section view of the lighting assembly of FIGS. 2A-2B.

FIG. 7 illustrates a lighting assembly according to another exemplary embodiment of this disclosure.

DETAILED DESCRIPTION

This disclosure relates generally to a vehicle lighting assembly, particularly a lighting assembly having a chamber and a light source that is outside the chamber. The chamber can be a reflective chamber provided within a housing. The reflective chamber receives light from the light source. The lighting assembly can be used as a headlight, taillight, turn signal, accent light, etc.

Figure 1:
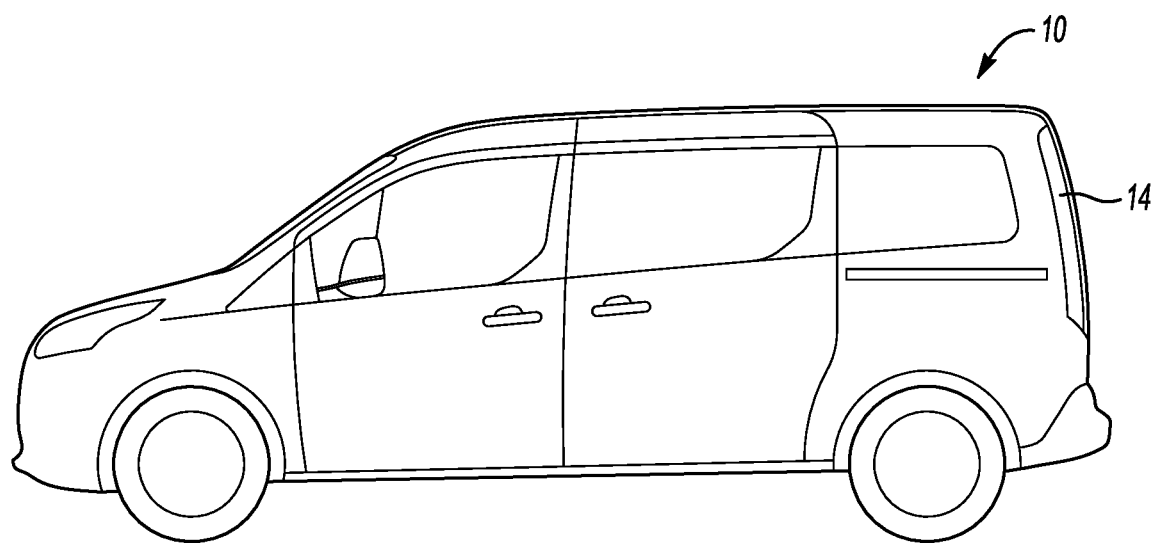
FIG. 1 illustrates a side view of a vehicle having a lighting assembly.
Figure 2A:
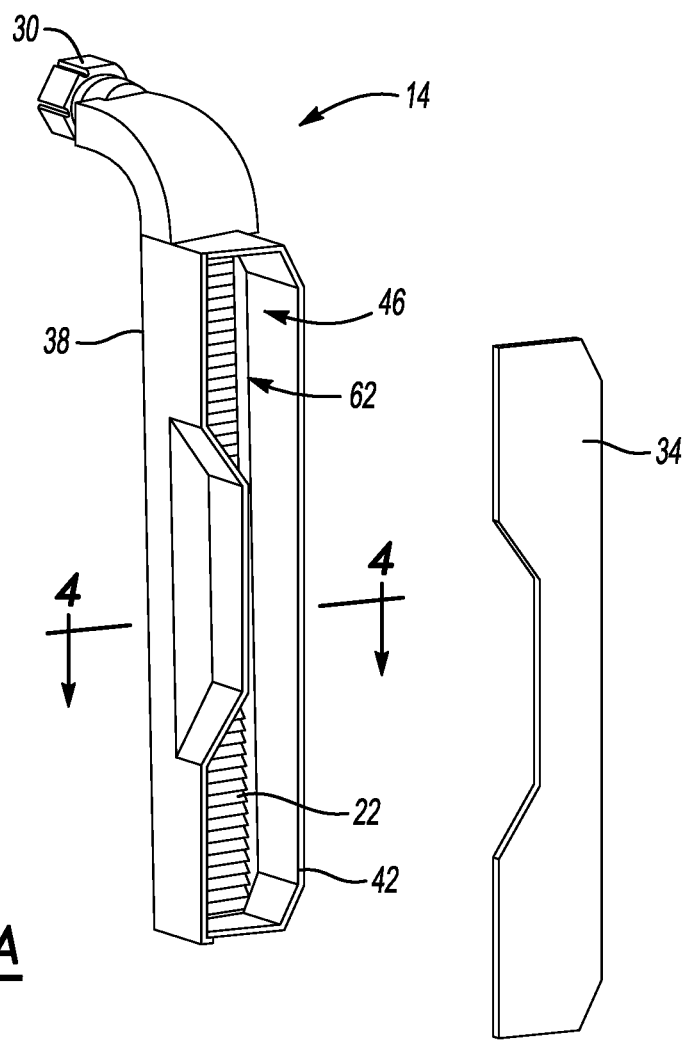
FIG. 2A illustrates the lighting assembly of FIG. 1 accordingly to an exemplary embodiment of this disclosure. A lens of the lighting assembly is in an uninstalled position for drawing clarity.
Figure 2B:
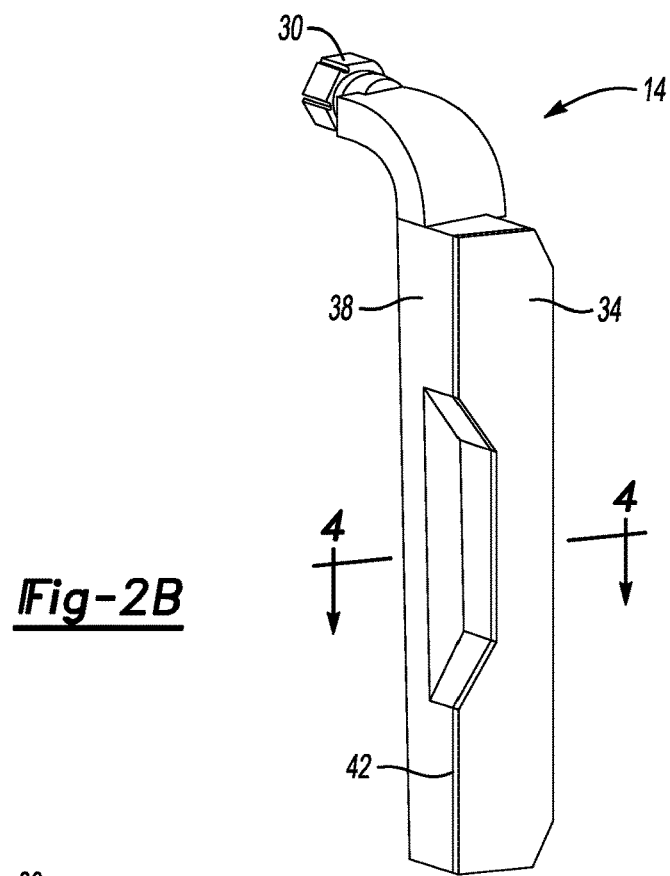
FIG. 2B illustrates the lighting assembly of FIGS. 1 and 2A when the lens is in an installed position.
Figure 3:
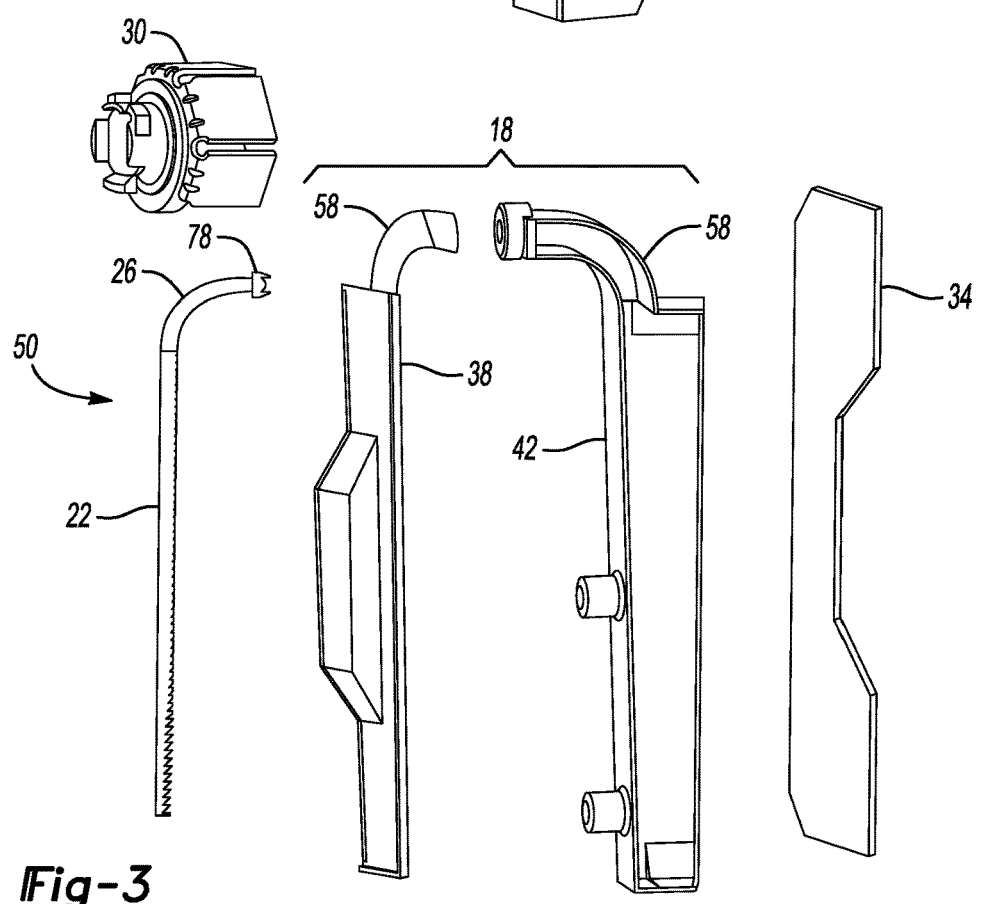
FIG. 3 illustrates an expanded view of the lighting assembly of FIGS. 2A-2B.
Figure 4:
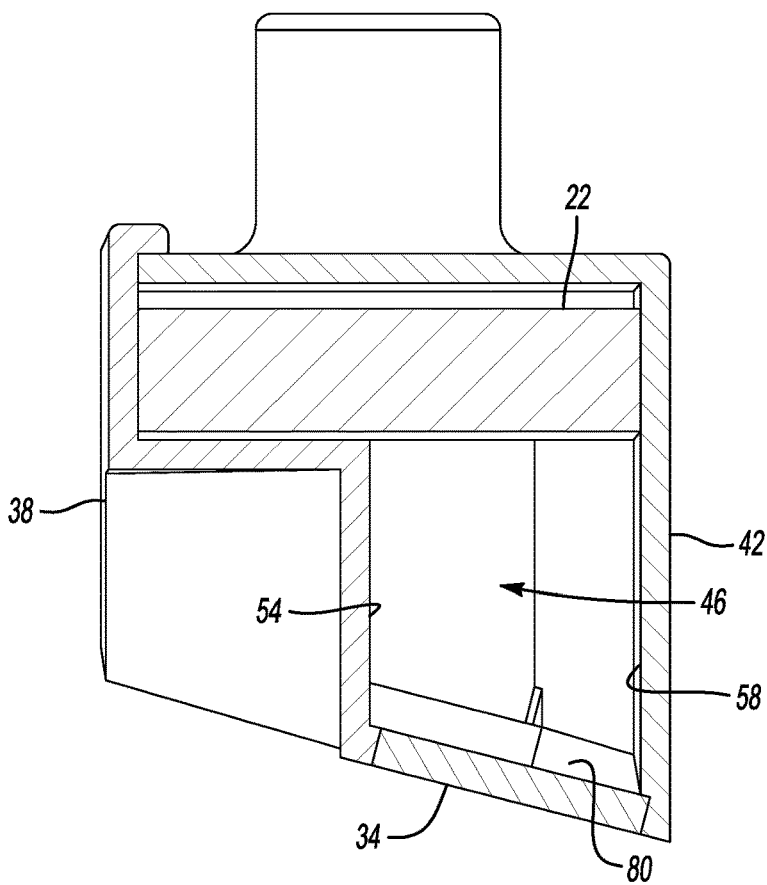
FIG. 4 illustrates a section view taken along line 4-4 in FIG. 2B.
Figure 5:
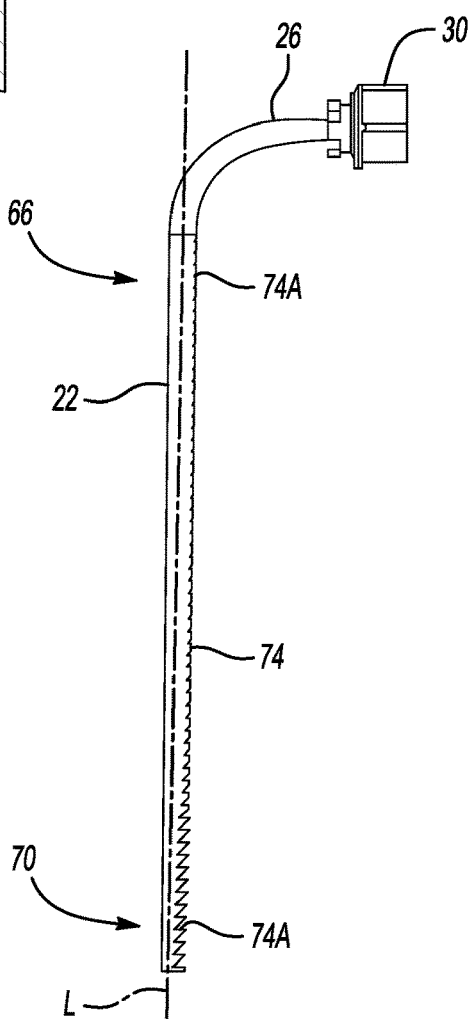
FIG. 5 illustrates a light delivery device of the lighting assembly of FIGS. 2A-2B.

With reference to FIG. 1, an example vehicle 10 includes a lighting assembly 14. In this example, the lighting assembly 14 is a rear taillight. Although the exemplary lighting assembly 14 is a taillight, the lighting assembly 14 could be another light of the vehicle 10.

Lighting assemblies, especially those that utilize light emitting diodes (LEDs) as light sources, can emit light having hot spots and dark spots. Hot spots are areas of relatively high intensity light, and dark spots are areas of relatively low intensity light. Further, in LED-based lighting assemblies, an intensity of the light can diminish moving away from the light source.

With reference now to FIGS. 2A-6, the lighting assembly 14 includes a housing assembly 18, a light emitter 22, a reflector system 26, a light source 30, and a lens 34. The housing assembly 18 includes a first section 38 and a second section 42 that together to form a chamber 46. The lens 34 is situated against the first and second sections 38, 42 to cover the chamber 46.

The light source 30 is outside the chamber 46. The light emitter 22 and the reflector system 26 together provide a light delivery device 50 The light emitter 22 portion of the device 50 is held within the chamber 46. The reflector system 26 portion of the device 50 extends generally from the light source 30 to the light emitter 22. The light delivery device 50 directs light from the light source 30 to the chamber 46. From the chamber 46, the light moves through the lens 34.

The chamber 46 can be a reflective chamber. In particular, the first section 38 is metallized and has a first metallized layer 54. Similarly, the second section 42 is metallized and has a second metallized layer 58. The first and second metallized layers 54, 58 line the chamber 46 in this example. The first and second metallized surfaces 54, 58 have high reflectivity and a low refractive index. Thus, within the chamber 46, the first and second sections 38, 42 will deflect rather than absorb light. The first section 38 and the second section 42 can be secured together using vibration or laser welding.

The example light emitter 22 extends along a longitudinal axis L between a first axial end portion 66 and a second axial end portion 70. In this example, the light emitter 22 includes a plurality of grooves 74 disposed side-by-side along the longitudinal axis L. Each groove of the plurality of grooves 74 extends transversely to the longitudinal axis L. A depth of the individual grooves 74 increases moving along the longitudinal axis L in a direction away from the first axial end portion 66 to the second axial end portion 70. For example, referring to FIG. 5, a particular groove 74A of the plurality of grooves 74 located near the first axial end portion 66 has a depth that is less than the depth of another groove 74B that is located near the second axial end 70. The deeper the grooves 74 reflect more light than shallower grooves 74, which can help to evenly distribute light within the chamber 46.

The reflector system 26 extends from the first axial end portion 66 of the light emitter 22 to the light source 30. In this example, the reflector system 26 is a collimator. The reflector system 26 is configured to convey light from the light source 30 to the chamber 46. The reflector system 26 can be corrugated which allows the reflector system 26 to be flexible. The reflector system 26 being flexible facilitates packaging the light delivery device 62. In other examples, the reflector system 26 can be rigid. The reflector system 26 includes at least two individual reflectors in this example.

The light emitter 22 and reflector system 26 which provide the light delivery device 50 can be formed together as a single, monolithic structure. In an example, the light emitter 22 and reflector system 26 are formed together from a polycarbonate material.

In the exemplary embodiment, a near field lens 78 can be removably connectable to the light source 30. The near field lens 78 can interface with the reflector system 26. Light from the light source 30 can pass through the near field lens 78 and the reflector system. 26.

The light source 30 can be one or more LEDs. As can be appreciated, light can diverge or converge as the light moves away from the light source 30.

In this example, the near field lens 78 receives light from the light source 30 and focuses the light into more of a parallel beam or pattern. The near field lens 78 then directs the parallel beam or pattern into the reflector system 26. The reflector system 26 then guides the light to the light emitter 22, which emits the light into the chamber 46.

From the chamber 46, the light is emitted through the lens 34. In this example, a surface 80 of the lens 34 that faces the chamber 46 is textured. Additionally or alternatively, the lens 34 can have a textured surface that faces outside the chamber 46. The surface 80 being textured provides light scattering or diffusion of light to promote the appearance of even light distribution throughout the lighting assembly 14. In one example, the textured surface 80 of the lens 34 diffuses the appearance of the light moving through the lens 34 from the chamber 46, which can help the light to appear more evenly distributed. In this regard, the surface 80 serves as a light diffuser. The textured surface 80 can be any translucent texture known in the art, such as such as MT-11010-MT-11030. Depending on the application, it may be desirable to use the lens 34 without a textured surface.

Notably, at least the light source 30 can be removed by a user without accessing the chamber 46. The user may wish to remove the light source 30 and replace it with a different light source to change appearance of the vehicle 10, for example.

A method of forming the lighting assembly 14 includes securing the first section 38 and the second section 42 together using vibration or laser welding. The first and second section 38, 42 being secured together forms the chamber 46. After securing, the light delivery device 62 can be inserted into the chamber 46 and secured. The reflector system 26 of the delivery device 62 is coupled to the first and second sections 38, 42 such that the reflector system 26 directs light into the light emitter 22.

With reference now to FIG. 7, another example lighting assembly 114 includes a first light source 130-1 that is connected to a first set of reflectors 182 and a second light source 130-2 that is connected to a second set of reflectors 186. The lighting assembly 114 also includes a first lens 190 and a second lens 192. The first lens 190 is situated adjacent to the second lens 192 to provide a light mixing area 194. Each of the first and second lenses 190, 192 include grooves similar to the grooves 74 of the lighting assembly 14.

The first lens 190 includes an opening 196 that defines a first segment 197 and a second segment 198. The opening 196 is configured to allow light to propagate towards the lens 34.

In operation, light propagates from the light sources 130-1, 130-2 to a respective one of the first and second sets of reflectors 182, 186, which redirect the light into a parallel beam. Once the parallel beam is formed, the first and second sets of reflectors 182, 186 direct light into the light mixing area 194. Light that reaches the grooves of the first and second lenses 190, 192 are reflected and mixed within the mixing area 194. The opening 196 allows light within the mixing area 194 to escape and propagate towards the lens 34.

Some features of the disclosed lighting assemblies include a light source that is relatively easy to replace. Light loss is also lessened by including a housing assembly and metallized chamber, thereby providing an even lighting appearance.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle lighting assembly, comprising:
    a housing including a first section and a second section, the first and second sections secured together to provide a chamber;
    a light emitter disposed within the chamber;
    a light source disposed outside the chamber; and
    a reflector system that directs light emitted from the light source to the light emitter within the chamber.

2. The vehicle lighting assembly of claim 1, further comprising a light delivery device including a first portion that provides the light emitter and a second portion that provides the reflector system.

3. The vehicle lighting assembly of claim 1, wherein the reflector system includes at least two reflectors.

4. The vehicle lighting assembly of claim 1, wherein the light emitter extends along a longitudinal axis.

5. The vehicle lighting assembly of claim 4, wherein the light emitter includes a plurality of grooves disposed along the longitudinal axis, the grooves each extending transversely to the longitudinal axis.

6. The vehicle lighting assembly of claim 5, wherein the light emitter includes a first axial end portion and a second axial end portion, wherein each of the grooves has a depth, and the depth of the grooves near the first axial end portion is different than the depth of the grooves near the second axial end portion.

7. The vehicle lighting assembly of claim 1, wherein the reflector system is a collimator.

8. The vehicle lighting assembly of claim 7, wherein the collimator is configured to convey light emitted from the light source to the chamber.

9. The vehicle lighting assembly of claim 7, wherein the collimator is a flexible collimator.

10. The vehicle lighting assembly of claim 7, wherein the collimator is rigid.

11. The vehicle lighting assembly of claim 1, wherein the chamber is lined with a first metallized layer of the first section and a second metallized layer of the second section.

12. The vehicle lighting assembly of claim 1, further comprising a lens that covers the chamber.

13. The vehicle lighting assembly of claim 12, wherein a surface of the lens that faces the chamber is textured.

14. The vehicle lighting assembly of claim 1, wherein the light source is a Light Emitting Diode.

15. The vehicle lighting assembly of claim 1, wherein the light source is a vehicle light.

16. The vehicle lighting assembly of claim 1,
    wherein the light emitter extends longitudinally along a longitudinal axis between a first axial end portion and a second axial end portion,
    wherein the light emitter includes a plurality of grooves disposed along the longitudinal axis and extending transversely to the longitudinal axis,
    wherein each of the grooves has a depth and the depths of the grooves near the first axial end portion is different than the depths of the grooves near the second axial end portion,
    wherein the reflector system is a flexible collimator configured to convey light emitted from the light source to the chamber,
    wherein the chamber is lined with a first metallized layer of the first section and a second metallized layer of the second section, and
    wherein a lens covers the chamber, the lens including a textured surface that faces the chamber.

17. The vehicle lighting assembly of claim 1, wherein the light emitter is polycarbonate.

18. The vehicle lighting assembly of claim 1, wherein the first and second sections that provide the chamber are welded together.

19. A vehicle lighting method, comprising:
    securing a first and second section of a housing assembly together to provide a chamber; and
    operatively coupling a reflector system within the chamber and a light source outside the chamber such that the reflector system can redirect light from the light source to a light emitter held within the chamber.

20. The vehicle lighting method of claim 19, further comprising redirecting light within the chamber through a lens using a metalized layer.

* * * * *